March 30, 1937. P. G. GATES Re. 20,312

BAILER

Original Filed May 6, 1933

INVENTOR
P. G. GATES
BY Hazard and Miller
ATTORNEYS

Reissued Mar. 30, 1937

Re. 20,312

UNITED STATES PATENT OFFICE 20,312

BAILER

Paul G. Gates, Long Beach, Calif.

Original No. 2,000,750, dated May 7, 1935, Serial No. 669,707, May 6, 1933. Application for reissue January 27, 1937, Serial No. 122,606

20 Claims. (Cl. 166—19)

This invention relates to improvements in bailers, which have been primarily designed for bailing wells.

An object of the present invention is to provide an improved form of bailer wherein there are two chambers, the lower of which constitutes a receiving chamber and the upper of which constitutes an air chamber. A valve is disposed between the chambers capable of establishing or breaking communication between them. When the bailer is lowered into the well the valve remains closed, confining air in the air chamber at atmospheric pressure. A one way valve provides ingress into the lower or receiving chamber so that as the bailer is lowered into the well the pressure within the lower or receiving chamber is equal to that of the weight of the column of fluid in the well above the bailer and through which the bailer is submerged. On encountering resistance, such as debris in the bottom of the well, the valve is automatically opened, allowing the fluid in the lower or receiving chamber to rush suddenly into the air chamber, compressing the air confined therein due to the high pressure at the bottom of the well, with the result that this sudden rush causes the lower or receiving chamber to be filled with debris, such as sand, milling cuttings and the like.

While this general principle of operation has been accomplished heretofore, resort in prior devices has been had to the use of poppet valves controlling the passage connecting the two chambers, the poppet valve being connected to that part of the bailer which encounters the resisting material in the well and urged into closed position until the bailer is resisted by a spring. In such devices the under side of the poppet valve has imposed thereon the pressure at the bottom of the well which is unequalized by the pressure in the air chamber. This inequality of pressures is overcome by a spring. However, in such devices a very fine adjustment of spring is required, especially in bailing deep wells inasmuch as great inequality of pressures may cause the valve to open before the bailer has reached the bottom of the well, or encountered the resistance, or in the event that the spring is made strong enough to overcome this resistance difficulty may be encountered in opening the valve against the action of the spring when the bailer reaches the bottom of the well. An object of the present invention consists in the development of a bailer which does not employ a poppet valve, nor a spring construction, to retain the valve in closed position against the unequal pressures acting on the valve during its lowering. The present invention contemplates the use of a slide valve so that the two chambers will remain isolated from each other throughout the entire lowering operation regardless of the depth of the well or the unequal pressures imposed and on encountering the resistance the valve will be caused to easily open with certainty.

Another object of the invention is to provide a bailer of extremely simple and durable construction wherein the space on the interior of the bailer is utilized to great advantage, enabling each trip of the bailer to pick up a maximum load.

Another object of the invention is to provide a construction wherein the weight of the upper chamber forming means, which may be considerable, being one or more lengths of pipe, is utilized at the bottom of the well to open the valve controlling the passage which establishes communication between the load chamber and the air chamber. In this way by using the weight of the upper chamber forming means itself to effect an opening of the valve there is great assurance that the valve will be open when the bailer lands so that there is no danger of the construction sticking or binding and preventing the proper operation of the construction when the bailer reaches the bottom of the well.

Another object of the invention is to provide a bailer of such design that it will not be dangerous when it is recovered from the well and is about to be opened at the surface. The present design is such that when the bailer is withdrawn from the well there is no danger of the entrapped high pressure, which is ultimately used to expel the contents of the bailer, being inadvertently released, causing injury, as long as the bailer remains suspended.

With the foregoing and other objects in view, which will be made manifest in the following detailed description, and specifically pointed out in the appended claims, reference is had to the accompanying drawing for an illustrative embodiment of the invention, wherein:

Figure 1:
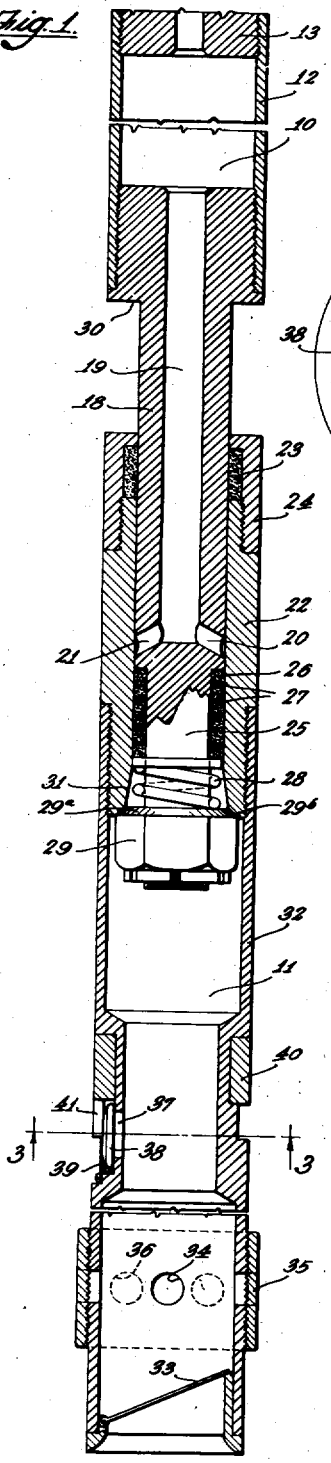
Fig. 1 is a partial view in vertical section through the improved bailer, illustrating the bailer in suspended position or in that position that it assumes on being lowered into the well.
Figure 3:
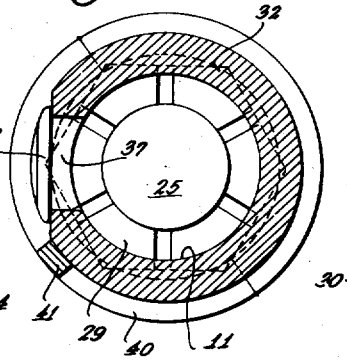
Fig. 3 is a horizontal section taken substantially on the line 3—3 of Fig. 1.
Figure 2:
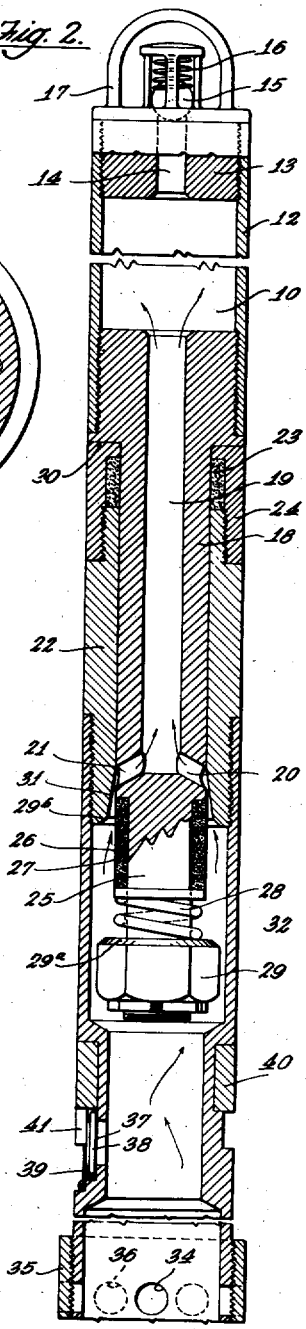
Fig. 2 is a partial view in vertical section illustrating the position of the bailer after it has landed or encountered resistance at the bottom of the well.

Referring to the accompanying drawing, wherein similar reference characters designate similar parts throughout, the improved bailer consists of a suitable construction providing two chambers, the upper chamber being indicated at 10 and the lower chamber being indicated at 11. The upper chamber may be formed of a suitable length of pipe, which is preferably reasonably long so as to give desired weight to the upper chamber forming means. The upper end of this pipe, indicated at 12, is closed by a plug 13 through which there is a passage 14 normally closed by a relief valve. While the construction of the relief valve may vary, it is illustrated as consisting of a ball 15 designed to seat in the upper end of passage 14 and urged into seating position by a spring 16. The ball 17, which is attached to the plug, forms a means by which the bailer can be suspended from a cable. The lower end of the pipe 12 has the upper end of a hollow stem 18 threaded into it. This stem, which has a bore 19 extending downwardly therethrough from its upper end, has ports 20 and 21 formed therein which terminate on the sides of the stem. The stem telescopes into a sub 22. Leakage between the top of the sub and the stem is prevented by means of packing 23 confined and compressed around the stem by means of a gland 24. The lower end of the stem 18 is of reduced diameter, as indicated at 25, and surrounding this portion packing rings 26 and steel rings 27 are disposed which are designed to pack off the lower end of the stem in the bottom of sub 22. These packing rings are urged into uppermost position by means of a spring 28 confined about portion 25 by means of a nut 29. The nut 29 is of such diameter as to be engageable with the bottom of the sub 22 to limit upward sliding movement of stem 18 within the sub. Immediately above nut 29 there may be a ring 29ᵃ presenting an outer beveled surface adapted to seat against a beveled seat 29ᵇ on the bottom of tubular member or sub 22. This tapered seat is formed at the very bottom of the tubular member. Downward sliding movement of stem 18 through the sub is limited by the engagement of shoulder 30 with the top of gland 24. In the uppermost position, as shown in Fig. 1, it will be noted that the ports 20 and 21 are opposite the interior of sub 22. The lower end of the sub is tapered out as indicated at 31 and when the stem is in its lowermost position the ports 20 and 21 are opposite this tapered portion or therebelow, as shown in Fig. 2. The tapered portion 31 facilitates entry of the packing rings back into the sub when the stem 18 is pulled up into the sub from the position shown in Fig. 2. The use of the ring 29ᵃ and the tapered seat 29ᵇ is not essential if the hollow stem has a close sliding fit with the interior of sub 22 or adequate packing is employed as at 26 and 27. Conversely where the ring 29ᵃ and seat 29ᵇ are used it is not essential to use the packing at 26 and 27 or to have an extremely close sliding fit between the hollow stem and the sub. However, where a close sliding fit is employed, and in addition thereto packing, and in addition to these ring 29ᵃ and seat 29ᵇ are also used, there is triple security against leakage of pressure into the air chamber 10 during the lowering of the bailer into the well.

The lower chamber is provided by a suitable length of pipe 32 threaded onto the lower end of the sub 22. At its bottom it carries a one way valve 33 providing ingress to the lower chamber. This type of bailer valve may be of any conventional construction. In the walls of pipe 32 there are formed a plurality of apertures 34 and surrounding this portion of the pipe there is a ring 35 having corresponding apertures 36. These apertures can be caused to register with apertures 34 or to be thrown out of registry therewith to open and close chamber 11 respectively. Near the upper end of chamber 11 pipe 32 has an outlet 37 formed therein. This is normally closed by an outwardly opening check valve 38 which is urged into closed position by a spring 39. A ring 40 is rotatable about the pipe 32 and carries a finger 41. On rotation of ring 40 the finger 41 can be caused to disengage spring 39 so that valve 38 can open outwardly against the action of the spring. When ring 40 is rotated so as to position finger 41 over the spring, the outwardly opening check valve 38 can be locked in closed position.

The operations and advantages of the improved bailer are as follows: When the bailer is originally lowered into the well both chambers are filled with air. Inasmuch as the bailer is suspended the upper chamber will assume its uppermost position with respect to the lower chamber as shown in Fig. 1. Ring 40 is rotated into a position to disengage finger 41 from spring 39. As the bailer is lowered into the well, lower chamber 11 may fill with liquid and as it continues its downward movement in the well the increased pressure causes whatever air may have been entrapped in the lower chamber to be expelled through outlet 37. Inasmuch as the upper chamber 10 is isolated from the lower chamber during this lowering movement while the bailer is suspended, the air confined within chamber 10 is maintained therein at atmospheric pressure. At the bottom of a deep well the difference between this atmospheric pressure and the external pressure of liquid in the well due to the weight of the column of liquid thereabove will be considerable. When the lower pipe 32 reaches the bottom of the well and has its downward movement arrested, the momentum and principally the weight of pipe 12 causes the upper chamber to move downwardly with respect to the lower chamber and assume the position as shown in Fig. 2. Although the stem 18 enters the lower chamber 11 during this movement, which has been previously filled with incompressible liquid during the lowering of the bailer, the incompressible liquid entrapped in lower chamber 11 does not prevent the downward movement of the stem inasmuch as escape may be had past check valve 38. In this position communication is established through the hollow stem from the lower chamber 11 to upper chamber 10 and on the establishing of this communication, inasmuch as there is a high pressure in chamber 11 and only atmospheric pressure in chamber 10, there is a sudden upward rush of liquid through chamber 11 compressing the air in chamber 10 into a very small volume and bringing its pressure up to the pressure of the liquid at the bottom of the well. This sudden upward rush of liquid in chamber 11 causes sand, debris, steel milling cuttings and the like, to be drawn into lower chamber 11 and to be entrapped therein by the one way valve 33. The bailer is then pulled up to the surface and on its initial upward movement the chambers separate from each other, that is the upper chamber moves upwardly with respect to the lower chamber from the position shown in Fig. 2 back into the position shown in Fig. 1. This again isolates the chamber 10 from chamber 11. As the bailer approaches the surface of the well the external pressure becomes relieved and becomes smaller than the entrapped pressure within chamber 10. This is partially equalized by escape taking place past relief valve 15. However, spring 16 is sufficiently strong to cause a certain degree of pressure to remain in chamber 10 over atmospheric pressure and while this pressure which is maintained in chamber 10 by the relief valve may vary, it normally will be between 100 and 200 pounds per square inch. As long as the bailer remains suspended by the cable, it will be noted that the upper chamber 10 having this retained pressure therein remains isolated from lower chamber 11 so that there is no danger of inadvertently allowing this pressure to escape and to create any injury as long as the bailer remains suspended.

When the bailer has been recovered, ring 35 is rotated to cause its apertures 36 to register with apertures 34. This opens bottom chamber 11. On lowering the bailer onto a derrick floor, the upper chamber is again placed in communication with the lower chamber and the retained pressure in the upper chamber is effective to expel and blow out the contents of the bailer. Previous to this blowing out operation it is advisable to rotate ring 40 so as to position finger 41 over spring 39 and thus lock check valve 38 closed so that the pressure will not tend to blow the contents of the bailer out through port 37. On again rotating rings 35 and 40 so as to close apertures 34 and to unlock check valve 38, the bailer is ready to make a second trip into the well.

In the improved construction it will be noted that any great inequality of pressures between the interior of air chamber 10 and the interior of loading chamber 11 having the pressure equal to that on the exterior of the bailer has no effect on the valve controlling communication between the chambers, which is sometimes detrimental in constructions employing poppet valves. Consequently the improved bailer can be lowered to any depth without danger of communication being established between the chambers until the bottom of the well is reached or until the bottom chamber has its downward movement arrested. On reaching the bottom of the well or on arresting the downward movement of the lower chamber, the weight of pipe 12 is always operable to cause stem 18 to slide downwardly through sub 22 and establish communication between the chambers. Consequently in the improved construction no fine adjustment of springs is required nor is any different adjustment necessary on lowering the bailer into wells of different depths.

In the improved construction also it will be noted that a large ample loading chamber is provided enabling the bailer to withdraw a large load from the well on each trip. Furthermore inasmuch as the landing of each bailer causes a very sudden upward rush of liquid through the loading chamber, a maximum quantity of debris, which it is desired to bail out, is recovered.

It will be noted that the improved construction also utilizes the weight of the parts which form chamber 10 to effect an opening of the passage which establishes communication between the loading chamber and the air chamber. In this way the weight of these parts, which may be the weight of one or more sections of pipe, insures an opening of the valve regardless of any tendency that there might be for the construction to stick or bind at the bottom of the well.

Inasmuch as the outer surface of the hollow stem is cylindrical, the connection between the load chamber and the air chamber is in reality a swivel enabling the air chamber, which is connected to the cable, to turn freely with respect to the load chamber. It is well known that when a long cable is subjected to tension, such as by the load of the bailer, it tends to twist. This twisting action on withdrawing the bailer does not involve a turning of the entire bailer inasmuch as the air chamber may swivel freely with respect to the load chamber.

It will be noted also that the limited sliding connection between the two chambers forms a type of jar so that if for any reason the load chamber should become stuck in the well there is an opportunity present in the construction of the bailer itself to jar the bailer loose. This is accomplished by raising and lowering the cable which involves a raising and lowering of the air chamber and on suddenly jerking the cable upwardly on each of its upward movements the nut 29 and the ring 29a will bump the sub 22 and load chamber upwardly, the sub 22 constituting an anvil.

Various changes may be made in the details of construction without departing from the spirit and scope of the invention as defined by the appended claims.

I claim:

1. A bailer comprising means providing upper and lower chambers telescopically connected together, a one way valve permitting ingress to the lower chamber, and a slide valve between the chambers operable by telescoping movement between the chamber forming means for establishing and breaking communication between the chambers.

2. A bailer comprising means providing upper and lower chambers telescopically connected together, a one way valve permitting ingress to the lower chamber, and a slide valve between the chambers operable by telescoping movement between the chamber forming means for establishing and breaking communication between the chambers, said slide valve being operable to establish communication between the chambers upon the lower chamber encountering resistance in a well and causing the upper chamber to move downwardly with respect to the lower chamber.

3. A bailer comprising means providing upper and lower chambers, a one way valve permitting ingress to the lower chamber, means providing a limited sliding connection between the chamber forming means whereby the upper chamber may move downwardly with respect to the lower chamber when the lower chamber encounters resistance in a well, a valve between the chambers operable to establish communication therebetween upon downward movement of the upper chamber with respect to the lower chamber and to close upon upward movement of the upper chamber with respect to the lower chamber, means providing an openable outlet from the lower chamber, an outwardly opening check valve for the lower chamber, and means for locking the check valve closed.

4. A bailer comprising means providing upper and lower chambers, a one way valve permitting ingress to the lower chamber, means providing a limited sliding connection between the chamber forming means whereby the upper chamber may move downwardly with respect to the lower chamber when the lower chamber encounters resistance in a well, a valve between the chambers operable to establish communication therebetween upon downward movement of the upper chamber with respect to the lower chamber and to close upon upward movement of the upper chamber with respect to the lower chamber, a relief valve for the upper chamber adapted to relieve pressure entrapped in the upper chamber as the external pressure is reduced, means providing an openable outlet from the lower chamber, an outwardly opening check valve for the lower chamber, and means for locking the check valve closed.

5. A bailer comprising means providing upper and lower chambers, a hollow stem secured to one of the chamber forming means and slidably extending into the other with a sliding fit, means limiting the sliding movement of the chamber forming means relative to each other, said stem having ports on its sides which when the bailer is suspended are closed by the sliding fit but when the bailer is supported are open to establish communication between the chambers, and means providing a one way valve leading into the bottom of the lower chamber.

6. A bailer comprising means providing upper and lower chambers, a hollow stem secured to one of the chamber forming means and slidably extending into the other with a sliding fit, means limiting the sliding movement of the chamber forming means relative to each other, said stem having ports on its sides which when the bailer is suspended are closed by the sliding fit but when the bailer is supported are open to establish communication between the chambers, means providing a one way valve leading into the bottom of the lower chamber, and means providing a relief valve for the upper chamber.

7. A bailer comprising means providing upper and lower chambers, a hollow stem secured to one of the chamber forming means and slidably extending into the other, means limiting the sliding movement of the chamber forming means relative to each other, said stem having ports on its sides which when the bailer is suspended are closed but when the bailer is supported are open to establish communication between the chambers, means providing a one way valve leading into the bottom of the lower chamber, a relief valve for the upper chamber, an outwardly opening check valve for the lower chamber adjacent its upper end, and means for locking the outwardly opening check valve closed.

8. A bailer comprising means providing upper and lower chambers telescopically connected together, and a slide valve between the chambers for establishing and breaking communication between the chambers, said slide valve being operable to establish communication upon lowering the upper chamber to the lower.

9. A bailer comprising means providing upper and lower chambers, a hollow stem extending downwardly from the upper chamber forming means, the lower chamber forming means providing a tubular part at its top in which the stem slidably fits, means limiting the sliding connection between the stem and tubular part, said stem having ports on its sides, which, when the bailer is suspended, are closed by the walls of the tubular part, but which are opened at the bottom of the tubular part when the bailer has landed, and entrapping means on the bottom of the lower chamber providing for ingress of material to the bottom chamber and its entrapment therein.

10. A bailer comprising means providing upper and lower chambers, a hollow stem extending downwardly from the upper chamber forming means, the lower chamber forming means providing a tubular part at its top in which the stem slidably fits, means limiting the sliding connection between the stem and tubular part, said stem having ports on its sides, which, when the bailer is suspended, are closed by the walls of the tubular part, but which are opened at the bottom of the tubular part when the bailer has landed, entrapping means on the bottom of the lower chamber providing for ingress of material to the bottom chamber and its entrapment therein, and packing means between the top of the lower chamber and the stem preventing leakage between the tubular part and the stem and to the ports when the ports are closed.

11. A bailer comprising means providing upper and lower chambers, a hollow stem extending downwardly from the upper chamber forming means, the lower chamber forming means providing a tubular part at its top in which the stem slidably fits, means limiting the sliding connection between the stem and tubular part, said stem having ports on its sides, which, when the bailer is suspended, are closed by the walls of the tubular part, but which are opened at the bottom of the tubular part when the bailer has landed, entrapping means at the bottom of the lower chamber providing for ingress of material to the bottom chamber and its entrapment therein, means providing a valve head on the bottom of the stem and a cooperative valve seat on the bottom of the tubular part forming a secondary valve closure between the chambers when the bailer is suspended.

12. A bailer comprising means providing upper and lower chambers, a hollow stem extending downwardly from the upper chamber forming means, the lower chamber forming means providing a tubular part at its top in which the stem slidably fits, means limiting the sliding connection between the stem and tubular part, said stem having ports on its sides, which, when the bailer is suspended, are closed by the walls of the tubular part, but which are opened at the bottom of the tubular part when the bailer has landed, entrapping means on the bottom of the lower chamber providing for ingress of material to the bottom chamber and its entrapment therein, and packing means between the lower chamber forming means and the stem, said packing means being arranged above and below said ports.

13. A bailer comprising means providing an upper chamber having a downwardly extending hollow stem, means providing a lower chamber having a portion closely fitting about the stem and slidable thereon between limits, said hollow stem having ports on its sides which are disposed within the closely fitting portion so as to be closed thereby when the bailer is suspended but which are open to the interior of the lower chamber when the bailer has landed, and means for entrapping material induced to enter the lower chamber.

14. A bailer comprising means providing an upper chamber having a downwardly extending hollow stem, means providing a lower chamber having a portion closely fitting about the stem and slidable thereon between limits, said hollow stem having ports on its sides which are disposed within the closely fitting portion so as to be closed thereby when the bailer is suspended but which are open to the interior of the lower chamber when the bailer has landed, means for entrapping material induced to enter the lower chamber, there being packing means between the closely fitting portion and the stem arranged above the ports in the stem.

15. A bailer comprising means providing an upper air chamber, means providing a lower entrapping chamber, one chamber providing means including a hollow stem movably extending into the other chamber providing means, there being mutually engaging means on the stem and said other chamber providing means serving to limit separating movement between the stem and said other chamber providing means, thus holding both chamber providing means assembled, there being one or more entrances to the stem arranged to be opened to establish communication between the chambers upon the air chamber descending relative to the entrapping chamber and to be closed when the air chamber is elevated relative to the entrapping chamber.

16. A bailer comprising means providing an upper air chamber, means providing a lower entrapping chamber, the air chamber providing means including a hollow stem slidably extending into the entrapping chamber providing means, there being mutually engaging means on the stem and entrapping chamber providing means serving to limit separating movement between the stem and the entrapping chamber providing means, thus holding both chamber providing means assembled, there being one or more lateral entrances to the stem arranged to be opened to establish communication between the chambers upon the air chamber descending relative to the entrapping chamber and to be closed when the air chamber is elevated relative to the entrapping chamber.

17. A bailer comprising means providing a lower entrapping chamber, means including a hollow stem movably extending into the entrapping chamber providing means forming an upper air chamber, there being an enlargement on the lower end of the stem engageable with the entrapping chamber providing means serving to limit separating movement between the chambers, there being one or more entrances to the stem above the enlargement arranged to be closed when the air chamber is in its uppermost position relative to the entrapping chamber and to be opened to establish communication between the chambers when the air chamber is moved downwardly relative to the entrapping chamber.

18. A bailer comprising means providing a lower entrapping chamber, means including a hollow stem movably extending into the entrapping chamber providing means forming an upper air chamber, means providing a beveled valve on the stem near the bottom thereof engageable with the valve seat in the top of the entrapping chamber, there being one or more lateral entrances to the stem arranged to be closed when the air chamber is in its uppermost position relative to the entrapping chamber and to be opened to establish communication between the chambers when the air chamber is lowered relative to the entrapping chamber.

19. A bailer comprising means providing a lower entrapping chamber, means including a hollow stem movably extending into the entrapping chamber providing means forming an upper air chamber, there being one or more lateral entrances to the stem arranged to be closed when the air chamber is in its uppermost position relative to the entrapping chamber and to be opened to establish communication between the chambers when the air chamber is lowered relative to the entrapping chamber, and means on the stem engageable with the entrapping chamber providing means for limiting separating movement of the chambers.

20. A bailer comprising means providing a lower entrapping chamber, means including a hollow stem movably extending into the entrapping chamber providing means forming an upper air chamber, there being one or more lateral entrances to the stem arranged to be closed when the air chamber is in its uppermost position relative to the entrapping chamber and to be opened to establish communication between the chambers when the air chamber is lowered relative to the entrapping chamber, and said means providing a beveled valve surface on the stem below the entrances, there being a complementary beveled surface on the entrapping chamber providing means engageable thereby for limiting separating movement of the chambers and serving when engaged to prevent ingress to the stem through the entrances.

PAUL G. GATES.